March 2, 1926.
D. ANDERSON
1,575,246
MICROMETER HEIGHT GAUGE
Filed March 11, 1922
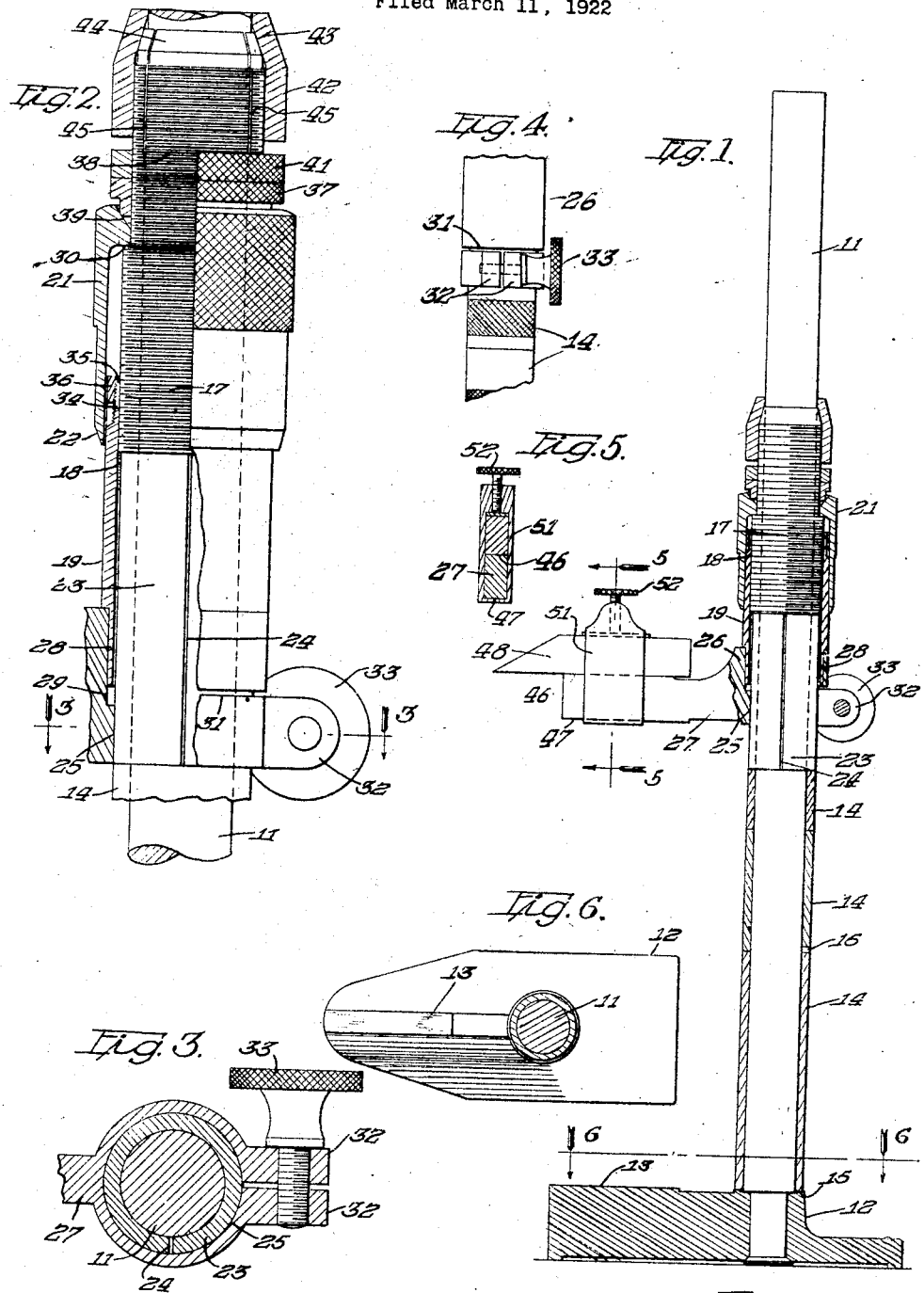
Inventor
Daniel Anderson
By Ira J. Wilson
Atty.

Patented Mar. 2, 1926.

1,575,246

UNITED STATES PATENT OFFICE.

DANIEL ANDERSON, OF ROCKFORD, ILLINOIS.

MICROMETER HEIGHT GAUGE.

Application filed March 11, 1922. Serial No. 542,855.

*To all whom it may concern:*

Be it known that I, DANIEL ANDERSON, a subject of Sweden, residing at Rockford, in the county of Winnebago and State of Illinois, have invented certain new and useful Improvements in Micrometer Height Gauges, of which the following is a specification.

This invention pertains in general to distance measuring instruments, and has more particular reference to that class known as height gauges. These instruments, used primarily in machine shop practice for obtaining the height of projections from plane surfaces, for the locating of bushings in jigs, for marking on one surface a line parallel to another surface, and for other purposes well known, have heretofore been characterized by the inclusion of a vernier scale for obtaining the measurements. It is well recognized that vernier scales, especially in a measuring instrument of this type are difficult to set and read accurately, and at any event in order to secure the desired degree of accuracy, very painstaking effort must be made either in setting the instrument or taking readings. Furthermore, this type of scale is not so generally understood by the average mechanic, consequently its use is limited.

The object of the present invention is to provide a height gauge of novel construction which obviates the objections to and the undesirable features of a so-called vernier height gauge. This object I obtain by the provision of a height gauge embodying a micrometer means of measurement. The micrometer is embodied in the gauge in a particularly novel and advantageous manner, whereby measurements within a relatively wide range may be quickly, easily, and conveniently obtained to a fine degree of accuracy and precision.

Another object is to provide a measuring instrument of the character described capable of a wide and increased range of uses in comparison with prior instruments of this character, the present instrument being capable of use as a height gauge, a micrometer caliper, a scribing or surface gauge, and for other uses which will be apparent hereinafter.

Still another object is to provide a micrometer measuring instrument of novel construction so designed that it may be used in every day practice and will maintain a high degree of accuracy and precision. At the same time, I have provided certain means for obtaining adjustment in compensation for wear.

My invention also contemplates the provision of a micrometer height gauge constructed in such simple and novel manner as to be capable of economical production, and which will serve practically and satisfactorily the purposes intended.

Other objects and attendant advantages will be appreciated by those skilled in this art as the invention becomes better understood by reference to the following description when considered in connection with the accompanying drawings, in which—

Fig. 1 is a vertical sectional view through the instrument with the micrometer screw in elevation;

Fig. 2 is an enlarged fragmentary view, partly in section and elevation showing the micrometer parts;

Fig. 3 is a cross sectional view taken on the line 3—3 of Fig. 2;

Fig. 4 is a fragmentary view looking at the right hand side of the lower portion of Fig. 2; and Figs. 5 and 6 are sectional views taken on the lines 5—5 and 6—6, respectively, of Fig. 1.

Referring more particularly to Figs. 1 and 2 which better show the details of construction, it will be observed that the micrometer and co-operating parts are carried on an upright post or rod 11 circular in cross section and rigidly supported on a base element designated generally by 12. This base recessed on its underside for clearance, is of sufficient length and width to provide a stable support. Upon the top of the base is a flat narrow contact surface 13 or working face having its longitudinal axis disposed radially with respect to the rod 11, constituting a face of a fixed jaw. Upon the rod 11 are adapted to be strung one upon another any of a plurality of gauge blocks or sleeves 14 of predetermined lengths. The lowermost gauge sleeve rests on a surface 15 co-planer with the surface 13. The purpose of these gauge sleeves is to provide a fixed face on which to accurately support a micrometer device which will be presently described at predetermined distances from the contact surface 13 or from the surface level on which the base rests. The micrometer device or unit as will be presently seen, may be freely slid lengthwise onto or off the rod 11 and likewise the gauge sleeves may be slid on or off the rod. My invention contemplates the provision with each instrument of a set of gauge sleeves of standard dimensions, such for example as one-half inch, one inch and two inch, respectively, although any other or intermediate dimensions might be employed. In the present instance, Fig. 1, I show two inch, one inch and one-half inch gauge sleeves superimposed one above the other on the rod 11, providing support for the micrometer unit and accurately locating the lower edge of the latter 3½ inches above the contact surface 13. The butt ends of these gauge sleeves are recessed at intervals as at 16 for clearance of any small particles which may lodge between the meeting surfaces of two adjoining sleeves.

The micrometer unit comprises a screw micrometer designated generally by 17, which is threadedly connected to and adapted to turn in a nut 18 which has scale graduations on its peripheral face spaced lengthwise thereof. The nut has an extended sleeve portion 19 to which is fixedly attached a movable jaw described hereinafter. A thimble 21 fixed to the screw 17, as will be presently described, has graduations on its beveled surface 22 co-operating with graduations on the nut 18. The micrometer screw, nut and thimble constitute the principal elements of a micrometer and are co-ordinated in a distinctly novel manner in the present instrument. The screw 17 has at its lower end an elongated shank 23 split longitudinally at 24, which shank is adapted to rest on the uppermost gauge sleeve 14 or on the surface 15, as the case may be. The lower end of the shank 23 passes loosely but fittingly through a bearing 25 in a hub 26 with which is formed integrally a radial arm 27 constituting a movable jaw complemental to the fixed jaw described above. The hub 26 is in effect, integral with the hub portion 19 of the nut, in the present instance the latter having a reduced lower end 28 pressed into the bore 29 in the hub 26. The hub 26 is split transverse to its axis at 31 and shaped to provide clamping arms 32 which are adapted to be clamped to the screw shank 23 by means of a thumb clamping screw 33. By tightening the thumb clamping screw 33, the sleeve portion 19 and the hub 26, or in other words, the nut element 18 of the micrometer and the movable jaw 27 will be locked to the screw element of the micrometer, and the screw element in turn will be locked to the rod 11. The purpose of this clamp or lock will be better understood hereinafter when considering the operation or use of the micrometer.

Means is provided for taking up wear between the screw 17 and the internal threads of the nut 18. To this end, the upper end of the nut portion 18 is reduced in diameter and threaded externally as indicated by 34, Fig. 2, and this reduced threaded portion is slotted longitudinally at circumferentially spaced points, one of which is indicated by 35. A nut 36 engaged on the threaded portion 34, which is slightly tapered, may be adjusted to contract the upper end of the nut 18 so as to take up for wear in the threads, and thus maintain the proper fit between the screw and nut element of the micrometer.

The thimble 21 is detachably secured or locked to the screw 17, so that the latter may be turned in the nut 18 by manual rotation of said thimble. In the present example, the thimble seats on a shoulder 30 on the screw, and a binding nut 37 threadedly engaged on the reduced externally threaded upper end 38 of the screw is adapted to be turned into wedging engagement with the beveled surface 39 on the thimble for fixedly securing it to the screw. A lock nut 41 serves to lock the binding nut 37 against displacement. To facilitate rotation of the thimble 21 by the thumb and forefinger, the periphery is knurled as shown.

In addition to the screw-locking thumb screw 33 described above, I have provided a means for directly locking the screw to the rod 11. This consists of a knurled nut 42 threadedly engaged on the reduced end 38 of the screw and having a cone surface 43 adapted to engage a complemental cone end 44 on the screw. The upper end of the screw is split longitudinally at three circumferentially spaced points 45 so that by tightening the nut 42 the split portions of the screw will be clamped to the rod 11.

The movable jaw 27 has parallel upper and lower surfaces 46 and 47 respectively, disposed at right angles to the longitudinal axis of the rod 11 and parallel with the contact surface 13 and the base line. The surfaces 13 and 47 constitute opposed contacts between which external measurements are taken. The arm 27 is also adapted for carrying attachments or extensions of different descriptions, such for example as a scribing point 48 shown in Fig. 1. Suitable means such for example as a saddle bracket 51 and a set screw 52 may be employed for detachably securing either of the points 48 or 49 to the arm 28.

The operation or use of the instrument is as follows: It will, of course, be understood that either the English or metric measure may be employed. In the present example I have shown the English measure and have employed standard micrometer measurements. That is, the pitch of the screw is 40 threads to the inch and the graduations on the periphery of the nut 18 are 40 to the inch, being numbered at each fourth graduation, as 0, 1, 2, 3, 4, and 5. The beveled edge of the thimble 21 is graduated 25 points equally circumferentially spaced, so that the reading of these points is in thousandths of an inch. When using this instrument for external dimensions, the micrometer unit will be supported on the rod 11 at an elevation closely approximating the external dimension of the article to be measured. In other words, a sufficient number of gauge sleeves 14 will be slipped onto the rod 11 to so position and support the micrometer unit that the part to be measured may be inserted between the opposed contact surfaces 13 and 47. In obtaining the measurement, the thumb screw 33 and the nut 42 will be loosened and the operator will turn the thimble 21 in either direction to feed the movable jaw 27 upwardly or downwardly as the case may be, to ascertain the desired measurement. While turning the thimble 21 the movable arm or jaw 27 should be held against rotation about the rod 11. When the desired measurement has been obtained the position of the thimble 21 may be fixed or locked with respect to the nut 18 by tightening the clamping screw 33. This clamping screw when tightened sufficiently, also locks the screw 17 and all of the parts carried thereby, to the rod 11. However, in order to further insure against displacement from this set position and to guard against even the slightest degree of inaccuracy the additional lock at the upper end of the micrometer device, in the form of the lock nut 42, has been provided. It will be observed that in taking the measurement referred to, the lower end of the screw 17 rests and turns upon the uppermost gauge sleeve 14. In Fig. 2, the lower edge of the micrometer screw is shown flush with the contact surface 47, or in other words, the graduation "0" on the thimble 21 is in registration with the graduation "0" on the hub 19. In Fig. 1, the micrometer screw has been adjusted to substantially elevate the movable jaw 27. The range of the micrometer adjustment in the present example is one-half inch, and it will be manifest that by use of various combinations of gauge sleeves, the range of measurement may be greatly varied. In fact, the micrometer device may be elevated to a maximum height on the extreme upper end of the rod 11 with just sufficient length of such rod engaged as to provide a stable support for the micrometer device and to enable the micrometer screw 17 to be clamped to the rod by means of the clamping screw 33. It will also be observed that the movable jaw 27, and in fact the micrometer unit, are freely rotatable about the rod 11, consequently allowing this jaw to be set at any radial position. This is especially desirable in those instances in which the elongated fixed jaw end of the base prevents approach of the movable jaw or the scribing point to the work. In such instance, considerable radial distance is gained by positioning the movable jaw at right angles to the major axis of the base. Another advantage following from the capacity of the movable jaw to swing to different radial positions is that it allows for measurement directly between the base line and the contact surface 47 when the jaw is placed so it overhangs the base. Furthermore, by the use of an underhung scribing point it is possible to work from the base line upwardly to within the maximum height limit of the instrument. Use of the instrument for scribing will be readily understood. This instrument may also be used as a micrometer caliper for measuring external dimensions and diameters between the opposed contact surfaces 13 and 47. Attention is also directed to the rapidity and ease with which the instrument may be accommodated to the taking of various measurements and to setting for different elevations. It will also be recalled that the micrometer unit and likewise the gauge sleeves are freely movable rotatably and longitudinally on the rod 11, and consequently may be instantly slipped on and off the rod. The gauge sleeves being of standard dimensions enable quick and accurate setting of the micrometer.

From the foregoing, it will be manifest that an instrument of the character described is capable of many uses, both as a measuring tool, a gauge and a scriber, and that the settings and readings may be quickly and easily made, especially in comparison with those instruments heretofore in use embodying vernier scales, which inherently limit the range of use and convenience of operation.

In conclusion, it should be understood that considerable change might be made in details of construction without departing from the spirit and scope of the invention as expressed in the appended claims.

I claim:

1. A micrometer height gauge comprising a surface-working base carrying an upright rod, one or more gauge sleeves adapted to be positioned on the rod, a micrometer screw adapted to be moved lengthwise and rotatable on the rod and to bear against the uppermost gauge sleeve for determining measurements, a graduated thimble on the micrometer screw for rotating it, a nut on the micrometer screw having graduations in co-operation with those on the thimble, and a contact member fixed to the nut and adapted to cooperate with said base.

2. A measuring instrument comprising a base element having a fixed jaw providing a contact face, a cylindrical rod fixed to said base element, one or more gauge sleeves of predetermined length adapted to be positioned on said rod in abutting relation, so that the end face of the gauge sleeve remote from the base element constitutes a fixed face of predetermined distance from said contact face, a micrometer screw slidable lengthwise on the rod adapted to contact against said gauge sleeve end face and to be revolved on said rod, a graduated thimble on the micrometer screw for revolving it, a nut on the micrometer screw having a graduated scale in co-operation with the graduations on the thimble, and a jaw fixed to the nut and having a contact surface complemental to that on the base element.

3. A height gauge comprising a surface-working base carrying an upright rod, a micrometer unit including a micrometer screw slidable lengthwise upon and rotatable about the rod and a nut on the micrometer screw carrying a contact member, and one or more gauge sleeves adapted to be positioned on the rod between the gauge and micrometer screw for locating the micrometer unit in predetermined relation to the base, the micrometer screw being positioned relative to the base by contact against the uppermost sleeve face.

4. In a measuring instrument of the character described, in combination, a supporting rod, a fixed jaw on one end of the rod, a micrometer screw slidable lengthwise upon and rotatable about the rod, a nut member threadedly engaged on the micrometer screw, a movable jaw secured to one end of said nut member, and one or more gauge sleeves adapted to be positioned on the rod between the fixed jaw and the micrometer screw for locating the latter a predetermined distance from the fixed jaw, said micrometer screw extending through the movable jaw into position to contact with the adjacent end of the gauge sleeve.

5. In a measuring instrument, the combination set forth in claim 4, including a hub on the nut member jaw through which hub the micrometer screw passes, the hub and screw being slotted longitudinally, and means for clamping the slotted portion of the hub to the screw and the latter to the rod for clamping the nut member jaw and micrometer screw to the rod.

6. In a measuring instrument of the character described, in combination, a supporting rod, a member carried by said rod and having a working face, means adapted to be removably positioned on the rod for establishing a fixed face a predetermined distance from said working face, a micrometer screw adapted to be moved lengthwise upon and rotatably about the rod and to bear against said fixed face for predetermined location on the rod, a nut threadedly engaged on the micrometer screw, and a member having a working face complemental to the first mentioned working face said member being fixed to the nut, whereby work is adapted to be measured between said faces.

7. In a measuring instrument of the character described, in combination, a supporting rod, a member on the rod having a contact surface, a micrometer screw adapted to be moved lengthwise upon and rotatably about the rod, a nut threadedly engaged on the micrometer screw, an arm radial with respect to the rod and being fixed to the nut and providing a contact surface, and a thimble fixed to the micrometer screw and over-reaching one end of the nut, there being co-operative micrometric graduations on said thimble and nut, and the micrometer screw extending beyond the nut member remote from said thimble end and being adapted to engage against said contact surface on the rod for determining the location of the micrometer screw thereon.

8. In a measuring instrument of the character described, in combination, a supporting rod, a micrometer screw co-axially mounted on the rod so as to revolve thereon and having an unthreaded portion split longitudinally, a nut threadedly engaging the micrometer screw, a contact arm having a hub surrounding said split portion of the micrometer screw and being fixed to the nut, said hub being split longitudinally, and means for clamping the split hub and the split portion of the micrometer screw to the rod.

9. In a height gauge of the character described, the combination of a base constituting a fixed jaw, an upright rod supported on the base, an externally threaded micrometer screw freely slidable upon the rod, a nut threadedly engaged on the micrometer screw, a thimble fixed to the micrometer screw for rotating it, a movable jaw fixed to the nut and being complemental to said fixed jaw and adapted to be moved with respect thereto both by movement of the micrometer sleeve on the rod and by relative adjustment of the nut and micrometer screw, there being co-operative micrometric graduations on the thimble and nut, means adapted to be positioned on the rod intermediate the base and micrometer screw for locating the latter a predetermined distance from the base, and means for clamping the micrometer screw to the rod.

10. In a height gauge of the character described, in combination, a base, an upright rod supported on the base, a micrometer unit mounted on said rod and adapted to be moved lengthwise thereon, said unit including a micrometer screw concentric on the rod and adapted to be revolved thereon, and including also a nut threadedly engaged on the micrometer screw and a radially projecting contact arm fixed to the nut, a plurality of gauge sleeves of predetermined lengths, any of which are adapted to be positioned on the rod intermediate the base and micrometer screw for supporting the micrometer unit in predetermined relation to the base, and means for securing the micrometer in fixed relation to the rod in any set position of the micrometer unit thereon.

11. In a height gauge of the character described, in combination, a base carrying an upright rod, a micrometer unit having a micrometer screw concentric on the rod and having a nut on said micrometer screw provided with a contact surface supported by and disposed radially with respect to the nut, said micrometer unit being movable longitudinally upon the rod and rotatably thereabout, and one or more gauge sleeves adapted to be positioned on the rod intermediate the base and micrometer screw for supporting the micrometer unit in predetermined relation to the base.

12. In a measuring instrument of the character described, in combination, a supporting rod, a micrometer screw concentric thereon, a nut threadedly engaged on the micrometer screw, a work contact surface fixed to the nut, a thimble concentrically disposed about the micrometer screw and over-reaching the nut, there being co-operative micrometric graduations on said thimble and nut, and means for removably attaching the thimble to the micrometer screw, there being a shoulder on the screw against which the thimble is adapted to be clamped, an annular beveled face on the other side of the thimble, and a clamping nut threadedly engaged on the micrometer screw and adapted to be turned against said beveled face for clamping the thimble against said shoulder.

DANIEL ANDERSON.